April 21, 1964 G. MERZ 3,130,391

CIRCUIT ARRANGEMENT FOR FERRITE-CORE STORAGE DEVICES

Filed July 25, 1960 2 Sheets-Sheet 1

INVENTOR.
G. MERZ
BY
Robert Harding Jr

CIRCUIT ARRANGEMENT FOR FERRITE-CORE STORAGE DEVICES

Filed July 25, 1960 2 Sheets-Sheet 2

INVENTOR.
G. MERZ
BY Robert Harding Jr.

United States Patent Office
3,130,391
Patented Apr. 21, 1964

3,130,391
CIRCUIT ARRANGEMENT FOR FERRITE-CORE STORAGE DEVICES

Gerhard Merz, Rommelshausen, Kreis Waiblingen, Germany, assignor to International Standard Electric Corporation, New York, N.Y., a corporation of Delaware Filed July 25, 1960, Ser. No. 44,956
Claims priority, application Germany Aug. 29, 1959
9 Claims. (Cl. 340—174)

In electronic control systems, particularly in electronic telephone-switching systems, it is desirable to store data and to be able to dispose of this data immediately after interrogation. Hitherto relay-storage devices or selector arrangements were often used to this end. These storage devices, however, are no longer suitable in circumstances where only very short times are available for the call-up or interrogation of the stored data, as is the case, for example, in electronic systems. Different kinds of storage devices are required for these systems and the well-known ferrite-core storage devices have proved to be suitable. The storage devices are required to be capable of temporarily storing an information and of transferring this information as rapidly as possible upon interrogation. In the course of this operation the stored information is erased again. Besides these high-speed or short-time storage devices, other kinds of storage devices are required which likewise permit the quick disposal of a stored information, but whose information is not erased upon interrogation. Such types of storage devices are known as semi-permanent storage devices. In these types of storage devices an accidental variation of the information, which might be caused by external interferences, is supposed to be impossible, but the intended variation of the stored information is only supposed to be carried out after longer time intervals, for example, after weeks or months, and then it is immaterial how much time the variation takes up. It is of no particular importance whether the storing of a new information takes only a few seconds or some minutes.

In cases where semi-permanent storage devices and high-speed storage devices are used simultaneously, special control arrangements are required. It is one object of the present invention to simplify the arrangements in which high-speed storage devices and semi-permanent storage devices are used simultaneously, and to couple the arrangement in such a way that both types of storage devices can be controlled by one control arrangement. According to the invention this is accomplished in that, besides the wires which are normally required for the writing and reading of the information, and which are led through the ferrite cores, an additional wire loop is assigned to each core, for selectably suppressing one readout signal during the interrogation of the respective ferrite core, and it is short-circuited in accordance with requirements.

The above-mentioned and other features and objects of this invention and the manner of attaining them will become more apparent and the invention itself will be best understood by reference to the following description of an embodiment of the invention, taken in conjunction with the accompanying drawing, wherein.

Figure 1:
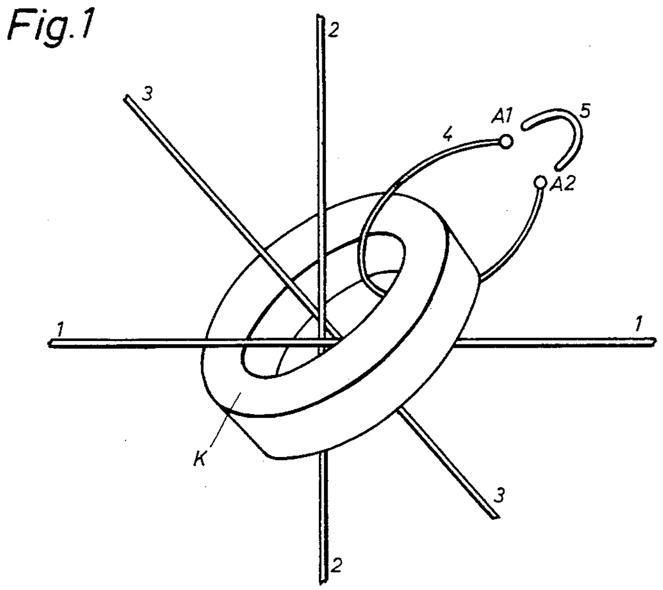
FIG. 1 is a schematic diagram illustrating the mode of operation of the inventive arrangement on principle.

In FIG. 1 the reference K indicates a ferrite core. The two wires 1 and 2 are led through the core in the conventional manner. If the core is arranged in a matrix, then these two wires respectively serve the writing-in or reading-out of the information. Furthermore, the wire 3 extends through the core, via which the read-out signal is taken off. In addition to these conventional wires, a wire loop 4 is led through the core. This loop can be short-circuited, if so required, by means of a conductive connecting member 5. The mode of operation of this arrangement is as follows:

For the storing or writing of an information, a writing pulse is simultaneously sent through both the wires 1 and 2. For the interrogation, a readout pulse is set in coincidence through these two wires. This read-out pulse is directed oppositely to the writing pulse. In the course of this operation a readout signal is produced in the wire 3 and is taken off via a readout amplifier. If now the additional wire loop 4 is short-circuited by the member 5, then the readout signal on the wire 3 is dampened to such an extent that at the most it only reaches the amplitude of a noise signal. This noise signal, however, is trapped and rendered ineffective by the amplitude discriminator which is arranged behind the readout amplifier. Accordingly, by short-circuiting the additional wire-loop 4 in accordance with requirements, it is possible, upon interrogation of the core, either to obtain a readout signal or to suppress such a signal. Even if the core should suffer a partial remagnetisation during the readout in the course of this process, this will generally be of no particular importance, because the core is restored anyway to the original condition by the next successive writing pulse.

Figure 2:
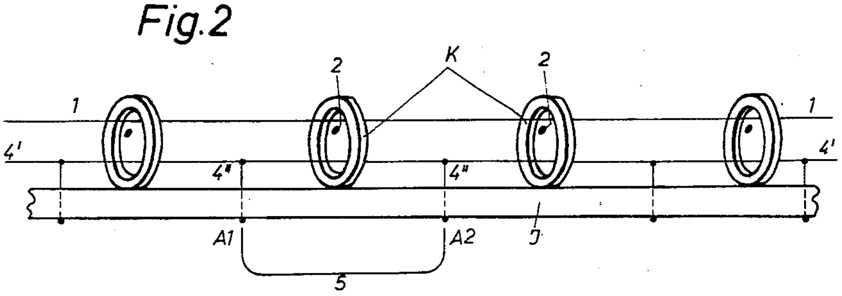
FIG. 2 is a schematic diagram showing the connecting-together of several ferrite cores.

Practically no individual or single cores are employed because the ferrite cores, in nearly all cases, are arranged in the storage devices in a matrix-shaped fashion. FIG. 2 shows a modified possibility as to how the additional wire loop may be embodied in such an arrangement. The cores K are arranged on a plate J of insulating material. It is assumed that the four shown cores all belong to one line of a ferrite-core storage device. In the conventional manner, the wire 1, which is required for the writing or reading of the information, is led through all cores of the line. The wire 2, which is assigned to the columns of the matrix, is here only denoted by way of a point. The wire 3, which is adapted to receive the reading signal, has been omitted. Now a wire 4′ is led through all of the cores K. On both sides of one ferrite core a tapping point 4″ is provided for this wire. These tappings lead to the connecting points A1 and A2, which are arranged on the plate J of insulating material. Wires connecting these tapped points, lying between two ferrite cores, are lead out to a connecting point on the plate of insulating material, assigned in common to two adjacent ferrite cores. If now a short-circuit is necessary for one of the cores, then merely a conductive connection 5 needs to be established between the two connecting points A1 and A2 assigned to this particular core. The short-circuit of the additional wire loop 4, may be effected by means of a plug-in connection at the connecting points. This arrangement has the advantage that the short-circuit point is easily accessible and that changing the stored information does not entail any difficulties. When suitably dimensioning the additional wire loop 4, for example, by the application of several windings, it is also possible to form the short-circuit of this additional wire loop with the aid of switching means which are, or may be, controlled from a remote point. These switching means may be relay contacts, transistors, or the like.

Figure 3:
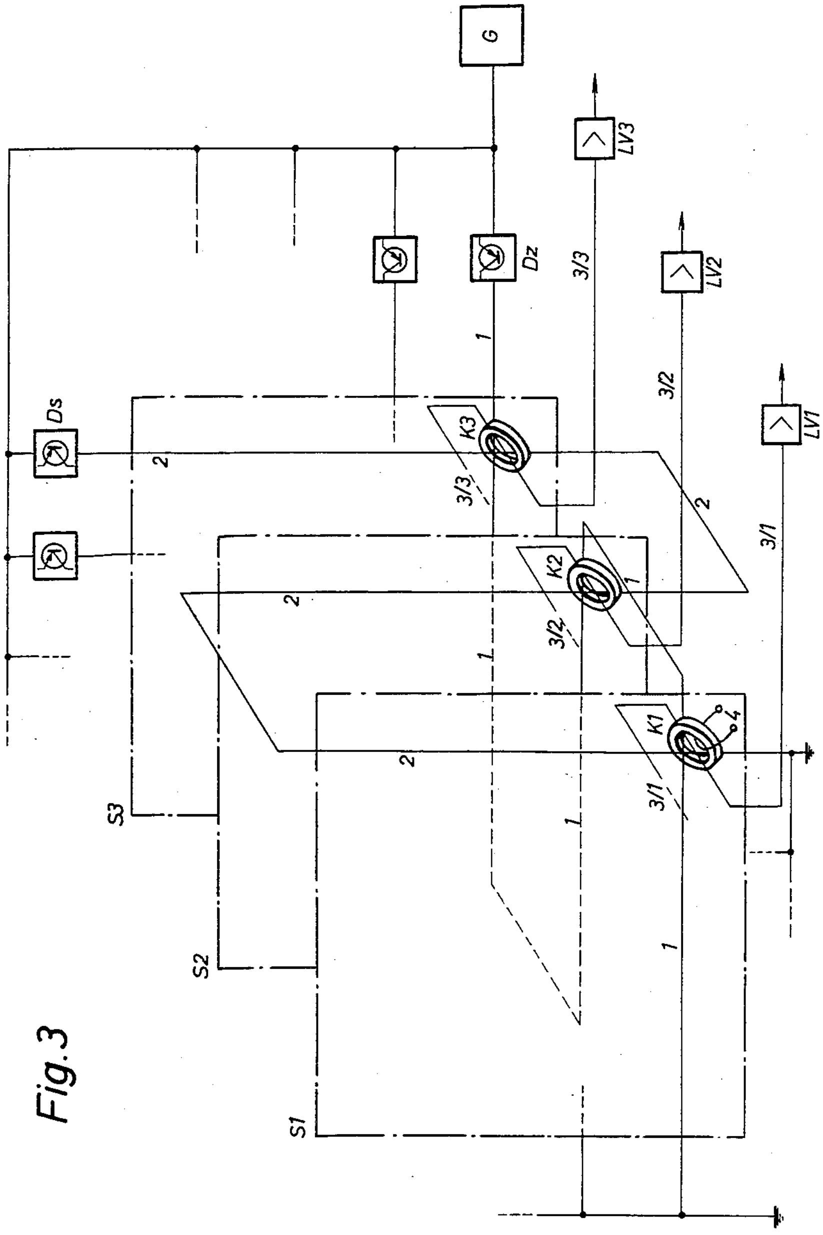
FIG. 3 is a schematic diagram showing one example of a practical application in which several ferrite-core storage devices, which are arranged in the shape of matrices, are controlled by a single control arrangement.

FIG. 3 shows three ferrite-core storage devices arranged in a matrix. The planes of these storage devices are indicated by the dot-and-dash lines. It is assumed that these storage devices are assigned to the subscribers within an electronic telephone switching system. The storage device S1 is a semi-permanent type of storage device in which, for example, the kind of restriction (admission, priority) of the individual subscriber is stored. The storage devices S2 and S3 are high-speed types of storage devices which are adapted to store temporarily the information accumulating during operation.

In these storage devices for example, the accruing charge units, or information concerning the circuit condition of the respective subscriber's station, may be stored. In each plane of a storage device only one core is shown. The core K1 belongs to the plane of the storage device S1. In addition to the usual wires, this core contains the wire loop 4, which can be short-circuited if so required. In this particular storage device the stored information can be established e.g. by a plug-in connection.

The cores K2 and K3 belong to the storage devices S2 and S3 respectively. All of the three storage devices, that is, the semi-permanent storage device S1, as well as the two high-speed storage devices S2 and S3 are controlled by a control device provided in common for all three of the storage devices. The control pulses are supplied by the pulse-generator G. The pulses, as supplied by the generator, are then applied to the individual lines or columns of the matrices by the connecting-through elements D*z* and D*s* respectively. For example, from the connecting-through element D*z* the line wire 1 is led through the core K3 of the storage device S3, then further through the remaining cores (not shown) of the same line of this storage device, and from there on to the corresponding line of the storage device S2, where it is led again through the core K2. The wire 1 is then further conducted to the storage device S1, and here it is led through the core K1. In a corresponding manner the column wire is led through all of the three storage planes. It also successively passes through the cores K3, K2 and K1. The reading wires are individually assigned to the three storage devices. These wires are not led in common from one storage plane to the other. The reading wire 3/1 belongs to the semi-permanent storage device S1 and leads to the readout amplifier LV1. In a corresponding manner both the reading wire 3/2 and the readout amplifier LV2 belong to the storage device S2, and the reading wire 3/3 and the readout amplifier LV3 belong to the storage device S3. Of course, in a known manner one inhibition-pulse generator with the corresponding inhibition wires must be additionally provided for both the planes S2 and S3. However, since this generator is of no particular importance to this invention, it is not particularly described herein and has been omitted in the drawings.

The controlling of the writing-in or reading-out of the information is effected in the conventional manner in the storage devices.

In the course of this procedure, readout signals are produced in the storage devices S2 and S3. These reading signals are amplified and transferred by the associated readout amplifiers. However, a reading signal only appears on the reading wire 3/1 of the semi-permanent storage device S1 if the additional loop 4 is not short-circuited. Accordingly, by short-circuiting the wire loop 4, as already mentioned hereinbefore, an output signal can be suppressed. During a common interrogation the storage devices S2 and S3 transfer their information to the readout amplifiers. In the course of this procedure the information is simultaneously erased in the storage devices and has to be re-stored in the conventional manner later on. However, in the semi-permanent storage device S1 the reading signal is suppressed if so required. In this case no erasure of stored information is effected. If, a changing of the stored information should become necessary after a longer period of time, then this can be carried out at any time by re-plugging the short-circuit connections.

In this simple way semi-permanent storage devices and high-speed storage devices composed of ferrite cores can be simultaneously controlled with the aid of one common control arrangement.

What is claimed is:

1. A circuit arrangement for ferrite core storage devices comprising a single-apertured ferrite core, a reading-out wire passing through said core, two writing-in wires passing through said core, means for applying a signal to said writing-in wires, an additional wire passing through said core, all of said wires passing through the single aperture in said core, and shorting means affixed to said additional wire for suppressing a read-out signal on said read-out wire when said writing-in wires are subjected to a signal.

2. A circuit arrangement, as claimed in claim 1, in which the ferrite core storage devices are arranged in a matrix, said cores forming the intersecting points of columns and rows, the additional wire passing through all cores of a predetermined line of cores.

3. A circuit arrangement, as claimed in claim 2, further comprising means for shorting the additional wire at each core individually.

4. A circuit arrangement, as claimed in claim 3, where the means for shorting each core individually comprises tapping points on the additional wire, each point assigned to two ferrite cores in common.

5. A circuit arrangement, as claimed in claim 3, further comprising tapping points on the additional wire, said tapping points located between adjacent cores in a line, and having wires extending from them to pluggable members, the short circuit of the additional wire being established by a plug to said pluggable members.

6. A circuit arrangement, as claimed in claim 1, in which the additional wire is led on both sides of the core to respectively two connecting points arranged on a plate of insulating material.

7. A circuit arrangement, as claimed in claim 4, further comprising switching means for controlling the establishment of a short circuit between tapping points.

8. A plurality of ferrite core storage matrices, as claimed in claim 7, employed in conjunction with a plurality of conventional high speed storage matrices, as semi-permanent storage devices, further comprising a single control arrangement, and means for simultaneously controling both types of storage devices by said control arrangement.

9. The circuit arrangement, as claimed in claim 8, where the simultaneous control means comprises column wires common to all of the storage devices.

References Cited in the file of this patent

UNITED STATES PATENTS

| | | |
|---|---|---|
| 2,284,406 | D'Entremont | May 26, 1942 |
| 2,901,735 | Lawrence | Aug. 25, 1959 |
| 2,902,677 | Counihan | Sept. 1, 1959 |
| 2,939,117 | Brown | May 31, 1960 |
| 2,979,701 | Marchand | Apr. 11, 1961 |